United States Patent
Kruse et al.

(10) Patent No.: US 7,862,469 B2
(45) Date of Patent: Jan. 4, 2011

(54) METHOD FOR CONTROLLING A DRIVETRAIN OF A MOTOR VEHICLE

(75) Inventors: Georg Kruse, Gifhorn (DE); Tobias Lösche-Ter Horst, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 593 days.

(21) Appl. No.: 11/897,280

(22) Filed: Aug. 30, 2007

(65) Prior Publication Data
US 2008/0058153 A1    Mar. 6, 2008

(30) Foreign Application Priority Data
Aug. 31, 2006  (DE) .................. 10 2006 040 945

(51) Int. Cl.
*B60W 40/12* (2006.01)
(52) U.S. Cl. .......................................... 477/3
(58) Field of Classification Search .............. None
See application file for complete search history.

(56) References Cited

U.S. PATENT DOCUMENTS

| | | | |
|---|---|---|---|
| 5,720,690 A | 2/1998 | Hara et al. | |
| 6,237,563 B1 | 5/2001 | Froehlich et al. | |
| 6,584,391 B2 * | 6/2003 | Lack .......................... | 701/51 |
| 6,845,305 B1 | 1/2005 | Raftari et al. | |
| 2001/0017227 A1 | 8/2001 | Amano et al. | |
| 2005/0209046 A1 | 9/2005 | Potter | |
| 2005/0288147 A1 * | 12/2005 | Endo et al. ..................... | 477/5 |
| 2008/0076623 A1 * | 3/2008 | Tabata et al. ................... | 477/5 |
| 2009/0139320 A1 * | 6/2009 | Bulgrien .................. | 73/115.02 |
| 2009/0240408 A1 * | 9/2009 | Wolfgang et al. ............ | 701/55 |

FOREIGN PATENT DOCUMENTS

| | | |
|---|---|---|
| DE | 4438914 A1 | 5/1996 |
| DE | 19527112 C1 | 9/1996 |
| DE | 19623847 A1 | 12/1996 |
| DE | 19733106 A1 | 2/1999 |
| DE | 102005012864 A1 | 10/2005 |

OTHER PUBLICATIONS

Extended European Search Report issued by the European Patent Office, dated Dec. 19, 2007.
Search Report issued by the German Patent Office, dated Jul. 24, 2007.

* cited by examiner

*Primary Examiner*—Sherry Estremsky
(74) *Attorney, Agent, or Firm*—Manfred Beck, P.A.

(57) ABSTRACT

A method for controlling a drivetrain of a motor vehicle is provided. The drivetrain includes, as components, at least an internal combustion engine, an electric drive machine, a clutch and a transmission that can be connected to drive wheels. A control device initiates gear shifts at the transmission based on a wide variety of sensor signals by using a characteristic diagram. In order to ensure an excellent shift quality over long operating periods, a drive torque value $M_V$ of the internal combustion engine, which is determined by the control device, can be checked and if necessary corrected in dependence of given conditions by determining the drive torque value $M_E$ of the electric drive machine.

10 Claims, 1 Drawing Sheet

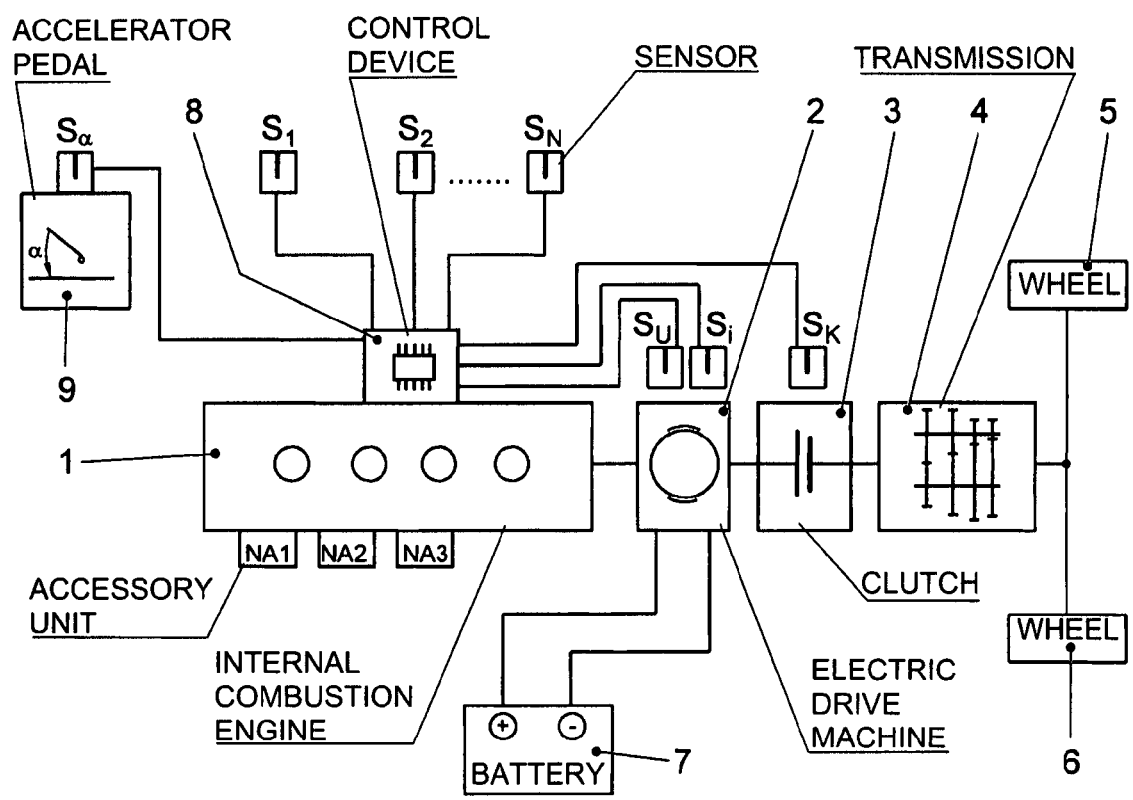

METHOD FOR CONTROLLING A
DRIVETRAIN OF A MOTOR VEHICLE

CROSS-REFERENCE TO RELATED
APPLICATION

This application claims the priority, under 35 U.S.C. §119, of German Patent Application No. DE 10 2006 040 945.0, filed Aug. 31, 2006; the prior application is herewith incorporated by reference in its entirety.

BACKGROUND OF THE INVENTION

Field of the Invention

The invention relates to a method for controlling a drivetrain of a motor vehicle.

A generic method for controlling a drivetrain of a motor vehicle is described in German Patent Application Publication No. 10 2005 012 864 A1 and in corresponding U.S. Patent Application Publication No. 2005/0209046 A1. These documents describe control strategies for automatic transmissions wherein the automatic transmission is a component of the hybrid drivetrain, which has an internal combustion engine and an electric motor as power sources. In order to establish the respective shift points, a strategy is proposed which takes into account whether the internal combustion engine is operated alone or in combination with the electric motor. However, these documents do not take into account the problem mentioned in German Patent No. DE 195 27 112 C1 according to which a sufficient precision in the determination of the drive torque supplied by the internal combustion engine is no longer guaranteed due to various signs of aging and wear phenomena, for example in the mountings, the gearwheel pairs and the vehicle tires. German Patent No. DE 195 27 112 C1 furthermore discloses a method for calibrating a characteristic diagram (input-output map) of an internal combustion engine which can be coupled to an electric drive machine as a component of a hybrid drive for a motor vehicle. The proposed method takes into account that the determination of the characteristic diagram can be performed even when the internal combustion engine is mounted in the motor vehicle and thus provides an alternative to the usual methods of determining a characteristic diagram on roller-type dynamometers. The above-mentioned document does not deal with the optimization of shift processes in vehicles having a hybrid drive.

Characteristic diagrams for gearshifts in automatic transmissions are usually defined such that the characteristic diagrams take for example into account the vehicle speed $v_F$, the rotational speed of the internal combustion engine $n_V$, the drive torque of the internal combustion engine $M_V$ and, if applicable, a number of further parameters such as for example the accelerator pedal angle $\alpha_F$ or its derivative with respect to time $d\alpha_F/dt$. In order to ensure smooth, jolt-free shift processes, it is necessary to ascertain the above-mentioned state quantities as precisely as possible by using sensors. This is easily possible with commercially available sensor technology when determining $v_F$, $n_V$ and for example also $\alpha_F$ or $d\alpha_F/dt$. In contrast, the process of deriving the drive torque from quantities that are provided by sensors is partly afflicted with errors because, due to temperature influences, in some cases complex load states when operating accessory units and also due to aging processes, there are in some cases conditions that are difficult to reproduce. Usually the drive torque of an internal combustion engine can for example be derived from at least one of a number of quantities including the air-mass throughput, the amount of injected fuel or the throttle valve angle. However, since these quantities provide only reference values and do not constitute an actual torque measurement, there are system-related inaccuracies as a result of the above-mentioned reasons and these inaccuracies have a feedback effect on the quality of the shift processes.

SUMMARY OF THE INVENTION

It is accordingly an object of the invention to provide a method for controlling a drivetrain of a motor vehicle which overcomes the above-mentioned disadvantages of the heretofore-known methods of this general type and which provides an improved shift quality over the entire operating life of a motor vehicle.

With the foregoing and other objects in view there is provided, in accordance with the invention, a method for controlling a drivetrain, which includes the steps of:

providing, as components of a drivetrain of a motor vehicle, at least an internal combustion engine, an electric drive machine, a clutch and a transmission, the transmission being connectable to drive wheels;

providing sensor devices supplying sensor information to at least one control device for acquiring different state quantities of the motor vehicle and/or at least one of the components of the drivetrain;

deriving a drive torque value $M_V$ of the internal combustion engine at least indirectly from signals of the sensor devices and utilizing the drive torque value $M_V$ of the internal combustion engine in order to control gearshifts with the at least one control device by using at least one characteristic diagram stored in the at least one control device;

detecting an operating state of the electric drive machine during operation of the internal combustion engine by using the at least one control device; and checking the drive torque value $M_V$ during operation of the motor vehicle in dependence of given conditions by performing the checking based on at least one quantity characterizing the operating state of the electric drive machine.

Another mode of the method according to the invention includes providing the state "clutch opened" as the given condition.

A further mode of the method according to the invention includes providing the state "closed clutch runs without slip" as the given condition.

Another mode of the method according to the invention includes detecting an operating state of an accessory unit as a given condition, such as an operating state of an air conditioning system, a pump for a power steering, an oil pump and/or a water pump.

Yet another mode of the method according to the invention includes operating the electric drive machine selectively as a motor and as a generator.

A further mode of the method according to the invention includes performing a current measurement representing a drive torque value $M_E$ of the electric drive machine in order to perform the checking at the electric drive machine.

Another mode of the method according to the invention includes determining a correction factor K for the drive torque value $M_V$ from a drive torque value $M_E$ of the electric drive machine ascertained during the checking if, as a result of the checking, a defined limit value for a difference between $M_E$ and $M_V$ is exceeded.

Another mode of the method according to the invention includes providing the drivetrain as a parallel hybrid drivetrain.

Another mode of the method according to the invention includes providing the transmission as a dual-clutch transmission.

In other words, in accordance with the invention, there is provided a method for controlling a drivetrain of a motor vehicle, the drivetrain having, as components, at least an internal combustion engine, an electric drive machine, a clutch and a transmission that is connectable to drive wheels; at least one control device is provided which receives information from sensor devices for acquiring different state quantities of the motor vehicle and/or at least one of the components of the drivetrain; the control device, for controlling gearshifts through the use of at least one characteristic diagram stored in the control device, utilizes a drive torque value $M_V$ of the internal combustion engine that is derived at least indirectly from signals of the sensor devices; the control device detects the operating state of the electric drive machine during operation of the internal combustion engine; wherein, during the operation of the motor vehicle, in dependence of given conditions, a checking of the drive torque value $M_V$ is performed, wherein the checking is performed on the basis of at least one quantity characterizing the operating state of the electric drive machine.

Thus, in accordance with the invention, the drive torque value $M_V$ is checked in dependence of predetermined conditions, namely on the basis of at least one quantity characterizing the operating state of the electric drive machine. This measure is based on the inventive realization that the characteristic diagram of an electric drive machine is extremely stable even over very long periods of time and therefore it is possible to conclude in a very precise manner what the respective torque is that acts on the electric drive machine. For electric drive machines that can also operate in a generator mode, it is thus possible to perform an exact torque determination when determining the value for the delivery of a torque as well as for the application of a torque from the internal combustion engine.

As a given condition for performing such a checking during the operation of the motor vehicle, states that occur anyway during the normal driving operation can be used in an advantageous manner. Such a state can for example be "clutch opened," if the vehicle stops at an intersection or at traffic lights. Alternatively, the checking can also be initiated if the clutch runs without slipping during the driving operation. This can be reliably detected by sensors at the clutch for example if a so-called zero torque (i.e. $M_V$=0) is present when transitioning from a load operation to an overrunning operation or vice versa.

Preferably, a current measurement representing the drive torque value $M_E$ is performed at the electric drive machine for checking the drive torque value $M_V$. The drive torque value $M_E$ of the electric drive machine determined in this manner is then compared to the drive torque value $M_V$ of the internal combustion engine that is derived with the control device. If a defined limit value for the difference between the value $M_E$, that is determined in a very precise manner, and the value $M_V$, that is determined with an inaccuracy inherent in the system, is exceeded, then a correction factor K is determined in the control device and the drive torque value $M_V$, which is usually determined in a sensor-based manner from a calculation model, is modified with the correction factor.

Starting with the relationships that gear shift=$f(v_F, n_B, M_V, \alpha_F, \ldots)$     1.

$M_V = K \cdot f(S_1, S_2, \ldots, S_N)$ with $S_{1-N}$=sensor signals     2.

$K = f([M_E - M_V]$ for given conditions)     3.

it is now possible, through the use of the checking process according to the invention, to retain a characteristic diagram (input-output map) for gear shifts that has been stored in the control device before even if, when determining the drive torque value $M_V$, there is a certain drift due to a wide variety of reasons. As an advantageous result, a re-calibration or post-calibration of the characteristic diagram need not be performed. Furthermore, noticeably improved shift qualities are achieved with the method according to the invention. It is also to be noted that in this case technology that is already present in the drivetrain anyway is utilized and no further outlay for sensor technology is required. It is also to be emphasized that the calculation model derived from the method according to the invention can be applied to a wide variety of combinations of internal combustion engines and transmissions.

The method according to the invention is thus based on a completely different approach than the method described in German Patent No. DE 195 27 112 C1. This method serves to create a characteristic diagram for an internal combustion engine with a comparatively small outlay. In contrast to that, the method according to the invention starts with an already existing characteristic diagram for shift processes for which only a characteristic quantity required for the shift point determination, such as the drive torque value $M_V$, is corrected, in order to then, on the basis of the thus corrected value, to reach the desired shift point in the existing characteristic diagram for a proper shift quality.

Other features which are considered as characteristic for the invention are set forth in the appended claims.

Although the invention is illustrated and described herein as embodied in a method for controlling a drivetrain of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE is a schematic block diagram of an embodiment of a drivetrain for illustrating the method according to the invention.

DESCRIPTION OF THE PREFERRED EMBODIMENTS

Referring now to the single FIGURE in detail, there is shown a drivetrain whose essential components are in this case an internal combustion engine 1, an electric drive machine 2, a clutch 3, a transmission 4, and wheels 5, 6. The electric drive machine is connected to a battery 7 and forms, together with the internal combustion engine 1, a so-called parallel hybrid drive. The electric drive machine 2 can be operated in a mode providing a motive power as well as in a generative mode such that, in addition to having a driving function for the vehicle, it can also function as a starter motor for the internal combustion engine 1 or as a generator for an on-board electrical system of the vehicle. Accessory drives, which are symbolically indicated, are in this case also part of the internal combustion engine 1, wherein for example NA1 can be an air conditioning system, NA2 a water pump, and NA3 a pump for a power steering. With respect to the implementation of the method according to the invention, the kind and the number of the auxiliary drives may be different from the outline shown in the drawing.

Particularly significant for the implementation of the method according to the invention is a control device 8 which, in order to determine the drive torque value of the internal combustion engine 1, can for example be supplied with information provided by sensors $S_1$ to $S_N$. In addition to that, the control device 8 receives also signals from sensors $S_u$ and $S_i$ that are assigned to the electric drive machine 2. The state of the clutch 3 is monitored with a sensor device $S_k$ whose signals are also supplied to the control device 8. Not shown in detail are furthermore sensors which are for example assigned to the transmission 4 and through the use of which the rotational speed of the internal combustion engine 1 or the vehicle speed can then be determined. Finally, reference numeral 9 indicates an accelerator pedal which preferably operates electronically (so-called e-gas) and which, via signals, is also connected to the control device 8.

The components and sensor devices which are schematically shown in the drawing are commercially available components in hybrid configurations and therefore do not require any further explanation with respect to their mode of operation. These components are however used in a skillful manner in that it can for example be ascertained via the sensor device $S_K$ whether it is possible to carry out a checking routine. For this purpose, the sensor device $S_K$ supplies the messages "clutch 3 opened" or "closed clutch 3 runs without slip." In order to achieve in this case reaction times that are as short as possible, the command for opening the clutch that is output by the control device 8 can in the meantime be used in order to already prepare the steps necessary for the actual checking process. As soon as the prescribed clutch states are reached, the sensor device $S_i$, through the use of a current measurement, indicates the torque acting at the electric drive machine 2 to the control device 8. Since no drive torque is transmitted to the wheels 5 and 6 when the clutch 3 is opened, the internal combustion engine 1 works only against drag torques during idling wherein the drag torques can result from the still rotating inertia masses, the internal friction of the internal combustion engine 1, the driving of accessory units or the electric drive machine 2. The drive torque value $M_V$ derived from the sensors $S_1$ to $S_N$ is now compared to the drive torque value $M_E$ of the electric drive machine that is determined by the sensor $S_i$.

If the result of this comparison is that the difference value $M_V-M_E$ exceeds a given limit value, then a correction factor K is determined on the basis of the difference value that has been determined wherein the drive torque value $M_V$ is modified in the control device 8 with the correction factor K. By using the thus modified drive torque value $M_V$, the control device 8 ascertains, on the basis of a defined shift characteristic diagram together with further characteristic quantities, the shift point that is necessary for an optimal shift.

The above-described method can be performed as required either every time when for example the clutch 3 is opened. It is however also conceivable that checking intervals are prescribed such that only after a certain number of times the clutch 3 is opened a checking is initiated again.

What is claimed is:

1. A method for controlling a drivetrain, the method which comprises:
   providing, as components of a drivetrain of a motor vehicle, at least an internal combustion engine, an electric drive machine, a clutch and a transmission, the transmission being connectable to drive wheels;
   providing sensor devices supplying sensor information to at least one control device for acquiring different state quantities of at least one of the motor vehicle and at least one of the components of the drivetrain;
   deriving a drive torque value $M_V$ of the internal combustion engine at least indirectly from signals of the sensor devices and utilizing the drive torque value $M_V$ of the internal combustion engine in order to control gearshifts with the at least one control device by using at least one characteristic diagram stored in the at least one control device;
   detecting an operating state of the electric drive machine during operation of the internal combustion engine by using the at least one control device; and
   checking the drive torque value $M_V$ during operation of the motor vehicle in dependence of given conditions by performing the checking based on at least one quantity characterizing the operating state of the electric drive machine.

2. The method according to claim 1, which comprises providing a state "clutch opened" as a given condition.

3. The method according to claim 1, which comprises providing a state "closed clutch runs without slip" as a given condition.

4. The method according to claim 1, which comprises detecting an operating state of an accessory unit as a given condition.

5. The method according to claim 1, which comprises detecting, as a given condition, an operating state of at least one accessory unit selected from the group consisting of an air conditioning system, a pump for a power steering, an oil pump and a water pump.

6. The method according to claim 1, which comprises operating the electric drive machine selectively as a motor and as a generator.

7. The method according to claim 1, which comprises performing a current measurement representing a drive torque value $M_E$ of the electric drive machine in order to perform the checking at the electric drive machine.

8. The method according to claim 1, which comprises determining a correction factor K for the drive torque value $M_V$ from a drive torque value $M_E$ of the electric drive machine ascertained during the checking if, as a result of the checking, a defined limit value for a difference between $M_E$ and $M_V$ is exceeded.

9. The method according to claim 1, which comprises providing the drivetrain as a parallel hybrid.

10. The method according to claim 1, which comprises providing the transmission as a dual-clutch transmission.

* * * * *